(12) United States Patent
Schmid

(10) Patent No.: US 7,284,670 B2
(45) Date of Patent: Oct. 23, 2007

(54) SEDIMENTATION REMOVAL ASSEMBLY FOR FLOW-THROUGH SEDIMENTARY TANK

(75) Inventor: Lawrence A. Schmid, Manhattan, KS (US)

(73) Assignee: Aero-Mod, Inc., Manhattan, KS (US)

( * ) Notice: Subject to any disclaimer, the term of this patent is extended or adjusted under 35 U.S.C. 154(b) by 581 days.

(21) Appl. No.: 10/977,660

(22) Filed: Oct. 29, 2004

(65) Prior Publication Data
US 2006/0091072 A1    May 4, 2006

(51) Int. Cl.
B01D 21/24 (2006.01)

(52) U.S. Cl. .................... 210/523; 210/532.1; 210/541

(58) Field of Classification Search ................ 210/523, 210/525, 532.1, 541, 542, 803
See application file for complete search history.

(56) References Cited

U.S. PATENT DOCUMENTS

| | | | |
|---|---|---|---|
| 1,947,428 A * | 2/1934 | Townsend et al. | 210/523 |
| 4,376,048 A * | 3/1983 | Kovacs | 210/523 |
| 5,435,924 A * | 7/1995 | Albertson | 210/525 |
| 6,234,323 B1 * | 5/2001 | Sarrouh | 210/525 |
| 6,371,308 B1 * | 4/2002 | Zhou | 210/523 |
| 6,878,295 B2 * | 4/2005 | Hubenthal et al. | 210/532.1 |
| 6,953,528 B2 * | 10/2005 | Nesfield | 210/532.1 |
| 2004/0222170 A1 * | 11/2004 | Hauge et al. | 210/523 |

* cited by examiner

Primary Examiner—Christopher Upton
(74) Attorney, Agent, or Firm—Hovey Williams LLP

(57) ABSTRACT

Solids removal assemblies (14) adapted for use in flow-through or batch-type sedimentation tanks (12) are provided which increase the efficiency of solids removal and eliminate physical scraping devices common with such sedimentation tanks. The preferred removal assemblies (14) include an elongated hood (34) disposed over a cooperating and complementally configured fill structure (26,28), which fills the majority of the internal volume of the hood (34). The hood (34) includes converging sidewalls (44, 46) having lower most inlet openings (54) and spaced, tubular outlets (56) adjacent the apex thereof. Outlet pipes (64) are operably coupled with each of the hood outlets (56) for suction withdrawal of waste water-solids suspensions which are then conveyed for downstream processing. The hood (34) and fill structure (26, 28) cooperatively define restricted flow paths for the waste water-solids suspensions, and assist in the creation of relatively high velocity movement of the suspensions to prevent bridging or clogging by collective solids adjacent the bottom of the tanks (12).

30 Claims, 3 Drawing Sheets

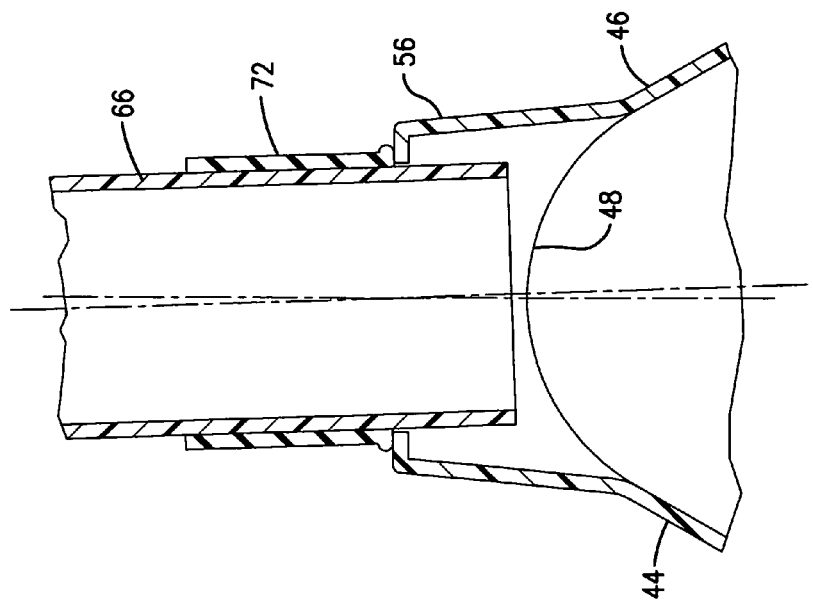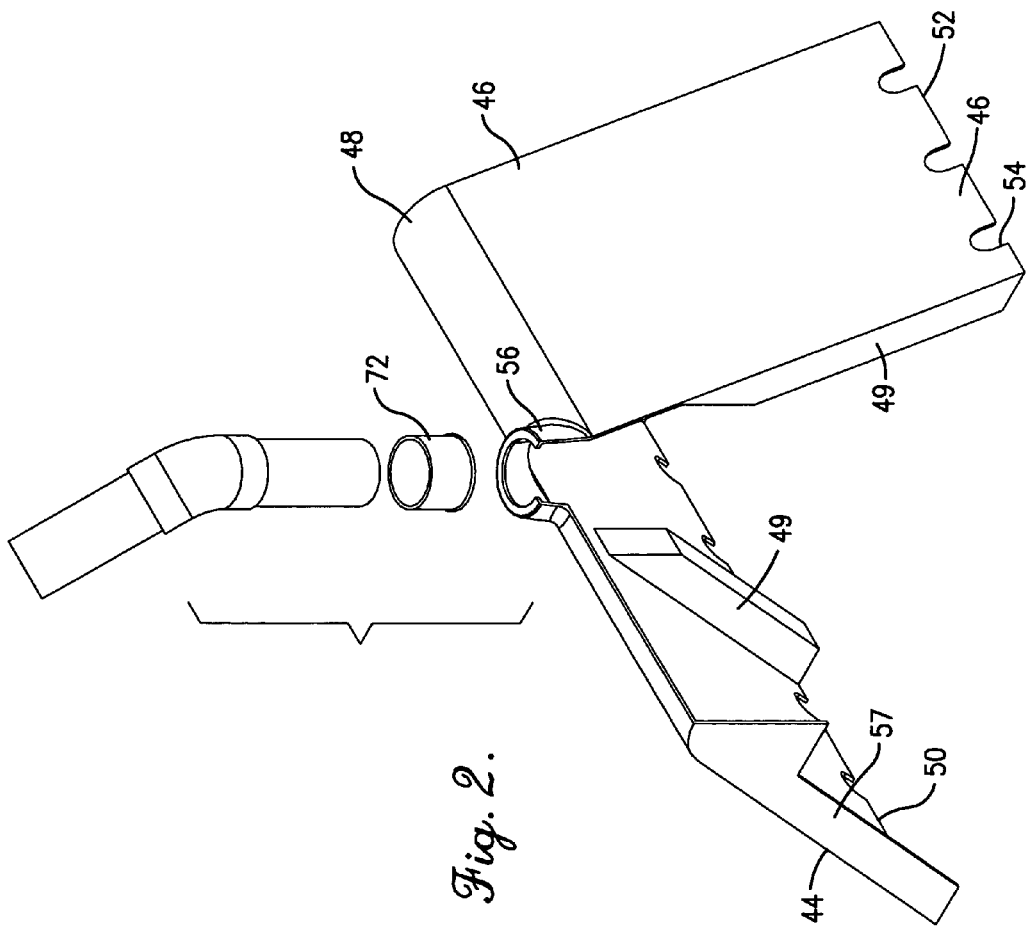

SEDIMENTATION REMOVAL ASSEMBLY FOR FLOW-THROUGH SEDIMENTARY TANK

BACKGROUND OF THE INVENTION

1. Field of the Invention

The present invention is broadly concerned with improved solids removal assemblies used in various types of sedimentation tank systems in order to more efficiently remove solids from incoming waste water streams. More particularly, the invention is concerned with such solids removal assemblies, as well as methods of operation and complete solids removal systems incorporating the solids removal assemblies. The preferred solids removal assemblies include an elongated hood having converging sidewalls together with an elongated fill structure located within the housing; a plurality of upright outlet pipes are operatively coupled to the hood for withdrawal of liquid-solid suspensions drawn into the hood, permitting downstream processing of the suspension.

2. Description of the Prior Art

A sedimentation tank forming a part of sewage or other waste water treatment facility is typically a tank designed to receive incoming waste water-solids suspensions, wherein the suspension is allowed to remain under quiescent conditions permitting gravitation of the solids to the bottom of the tank. Solids-free liquid is then withdrawn from the surface of the tank, while solids are withdrawn from the bottom. Such sedimentation may occur with a flow-through sedimentation tank where a waste water-solids suspension is continuously introduced and solids and liquids are continuously withdrawn. Alternately, the sedimentation tank may be of a batch variety where the tank is filled with the suspension and solids and liquid are withdrawn in batches.

In sedimentation tanks of both types, the clear liquid is typically skimmed or discharged from the surface of the tank by displacement. This generally can be readily accomplished. However, removal of the solids presents a more difficult problem. Some solids, such as sand-type materials, will settle rapidly and normally require some form of physical scraping to remove them from the bottom of the tank. With these rapidly settling solids, disturbance of the solids by the removal device or method is usually not a problem, as the solids quickly resettle after disturbance. Other solids, such as chemical or biological flocculants, are very lightweight and settle slowly. They are accordingly very susceptible to resuspension by any turbulence caused by a sludge or solids removal mechanism at the base of the sedimentation tank.

In flow-through sedimentation tanks, removal of solids must occur on a near-continuous basis, or else the tank will ultimately fill with solids. However, it is also necessary to provide conditions which are as quiescent as possible to prevent resuspension of solids back into the clarified liquid. Again, this is particularly troublesome in the case of lightweight flocs.

The prior art has developed a number of approaches for solids removal from sedimentation tanks. As indicated, physical removal techniques have included drag arms attached to a drive mechanism and operable to physically pull the solids from the bottom of the sedimentation tank to a central collection point, where they are either removed by gravity or by pumping. Another method used in circular sedimentation tanks is to employ a rotating device that pivots around the center of the tank. Such a device includes plow-like scrapers that physically scrape settled material to a central hopper where it is removed by gravity or pumping. Such devices have the advantage of positive removal of solids, but suffer from the disadvantage of physically moving a scraper or the like through already settled materials. When the material is light and fluffy, this movement resuspends the solids which will slip over the top of the scrapers and also create undesirable currents within the sedimentation zone.

In order to ameliorate the effects of physical scraping and plowing, some systems include tubes attached to the scraping devices in order to suction the material. This does offer some advantages of the lightweight materials; however, a structure which must move through the settled solids is still required.

Another type of solids removal device includes structure at the bottom of the sedimentation tank so that the solids will settle down slopes and collect in a hopper. Typically, a mechanical or airlift pump is placed near the bottom of the hopper and is operated continuously or intermittently to pump solids out of the hopper. This system has the disadvantage that in order to create slopes for solids to settle, the surfaces need to be at least 60° relative to the horizontal, and the solids need to be smooth to facilitate collection thereof. There becomes a practical limit on how deep this hopper can be because the hopper extends upwardly into the sedimentation tank at an angle of 60° or more.

Another disadvantage of this type of system is that the settled solids tend to "bridge" within the hopper zone, with the pump then removing only clear liquid while the solids compact and build up above the "bridge." In order to keep this from happening, the pump is often run continuously to prevent bridging. However, when this is done, too much liquid is removed with the solids. When the solids are removed from the excess liquid during downstream processing, the removed liquid must be returned to the sedimentation tank, increasing the hydraulic load on the system and decreasing the capacity thereof.

SUMMARY OF THE INVENTION

The present invention overcomes the problems outlined above and provides improved solids removal assemblies adapted for use in a variety of sedimentation tanks, such as flow-through or batch tanks. Broadly speaking, the solids removal assemblies of the invention comprise an elongated hood having sloped, converging sidewalls and a top section, with the hood defining an internal volume. The hood sidewalls have lower margins adapted to rest upon the bottom wall of a tank and include inlet openings adjacent the lower margins of the sidewalls. In addition, the hood has a top section including a plurality of spaced apart outlet openings. The assemblies also have an elongated fill structure located within the hood and occupying a majority of internal volume of the hood. The fill structure and said hood sidewalls cooperatively define a restricted flow path from the inlet openings towards the outlet openings of the hood. Preferably, a plurality of upright outlet pipes are operably coupled with the hood outlet openings in order to permit suction removal of waste water-solids suspensions. These outlet pipes communicate with a trough or other device for conveying the suspension for downstream processing.

In its method aspects, the invention involves treatment of waste water including flocculant solids therein by first directing the waste water-solids suspensions into a sedimentation tank. A portion of the solids are then removed by causing at least a part of the solids to first descend within the tank and pass through a restricted opening, and then to move upwardly along a restricted flow path toward an outlet. The waste water-solids suspension moves at a velocity of at least 1.5 feet per second (fps) through the restricted opening, and then moves at a velocity of at least 1 fps during the upward movement thereof along the restricted flow path thereby assuring that the flocculant solids remain in suspension. Thereupon, the upwardly moving waste water and suspended flocculant solids are directed towards a solids removal device.

BRIEF DESCRIPTION OF THE DRAWINGS

FIG. 2 is a fragmentary, perspective, exploded view depicting one of the hoods forming a part of a sedimentation removal assembly of the invention;

FIG. 4 is an enlarged, fragmentary vertical sectional view illustrating a preferred flexible connection between a hood outlet and a corresponding outlet pipe.

DETAILED DESCRIPTION OF THE PREFERRED EMBODIMENT

Figure 1:
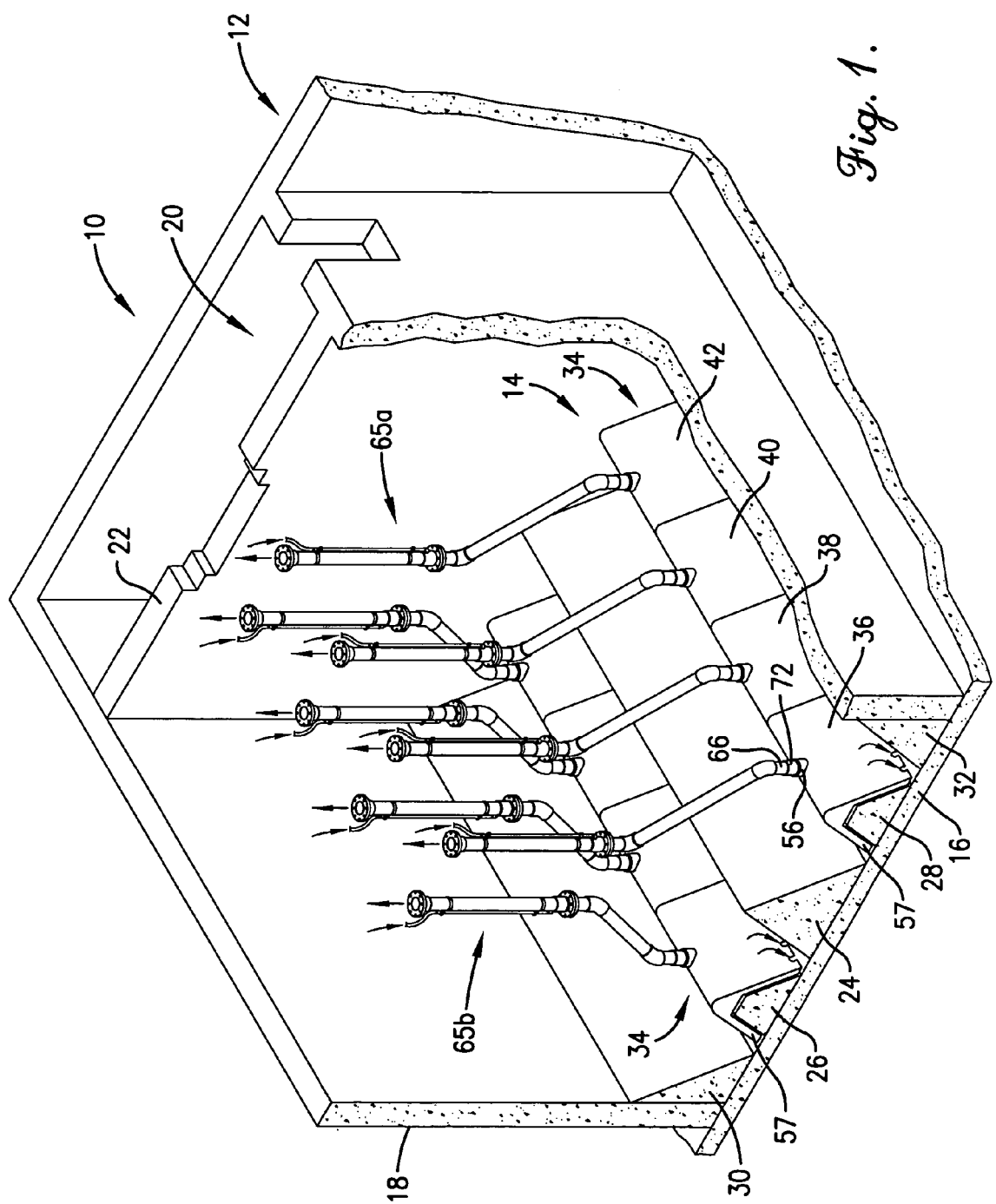
FIG. 1 is a fragmentary perspective view of a flow-through sedimentation tank in accordance with the invention, illustrating a pair of the sedimentation removal assemblies of the invention.

Turning now to the drawings, FIG. 1 illustrates a sedimentation tank assembly 10 broadly including an upright sedimentation tank 12 as well as a plurality (here two) of sedimentation removal assemblies 14 located adjacent the bottom of the tank 12. The assembly 10 is designed to efficiently remove solids of various densities from incoming waste water as a part of treatment thereof. The overall assembly 10 is similar in many respects with the clarifier assembly described in U.S. Pat. No. 5,035,795 incorporated by reference herein, particularly in the details of construction relating to waste water inlets and outlets. That is, the present invention is particularly directed to the improved, below water level assemblies 14, and these may be employed in a variety of different types of sedimentation or other solids removal tank systems.

In more detail, the tank 12 is formed of poured concrete and includes a bottom wall 16 as well as upstanding tank-defining sidewalls 18. The tank also has a recycle section 20 separated from the main body of the tank 12 by a wall 22. The bottom wall 16 includes a central, upstanding diverter section 24, as well as a pair of elongated fill sections 26 and 28 respectively located on opposite sides of the section 24. Finally, the bottom wall 16 supports a pair of diverter segments 30, 32 respectively located along the length of opposing sidewalls 18, in facing relationship to the fill sections 26 and 28.

Figure 3:
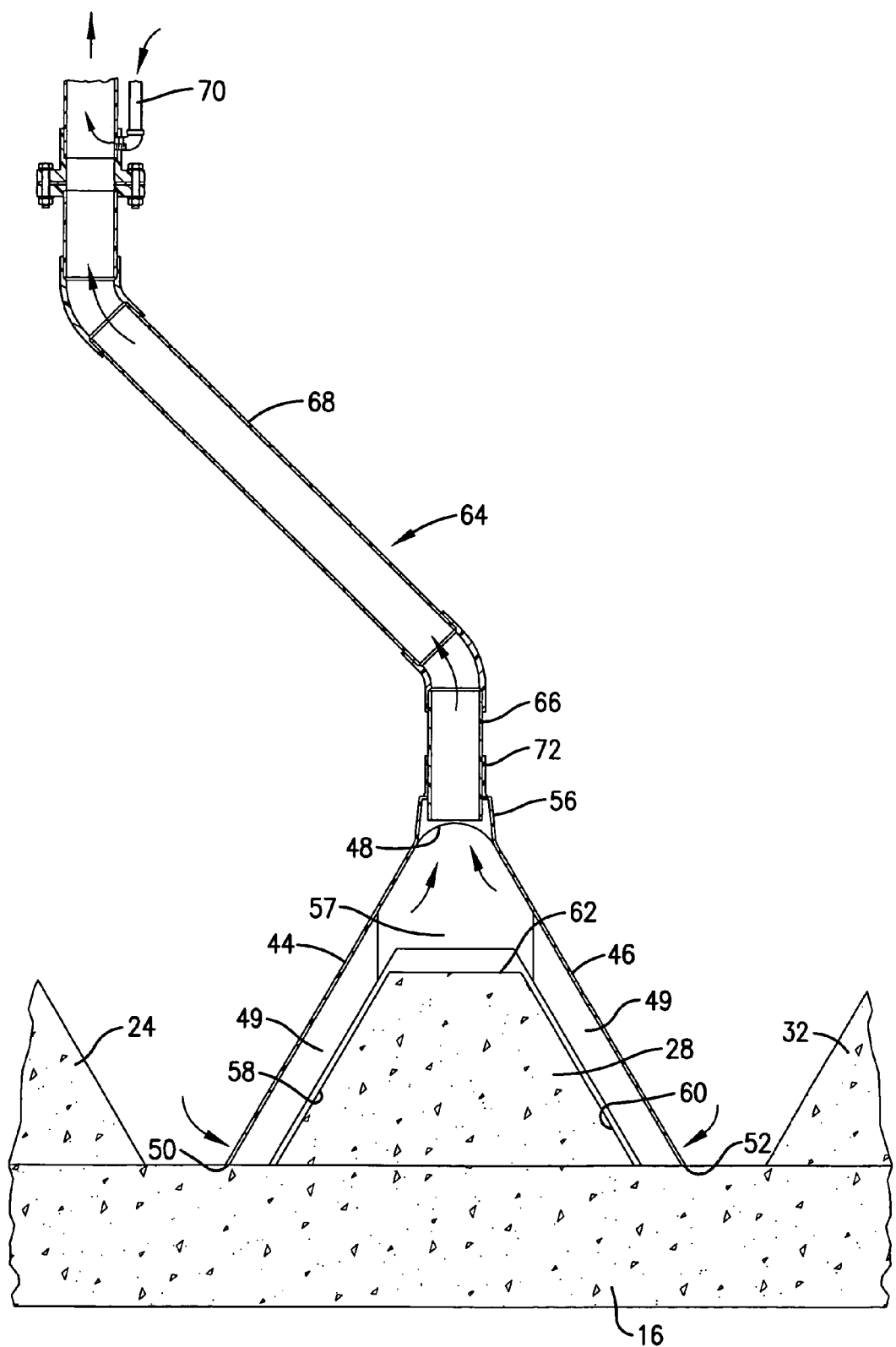
FIG. 3 is a vertical sectional view of a preferred sedimentation removal assembly.

Each of the assemblies 14 includes, in addition to one of the fill sections 26 or 28, a hood 34 which overlies the fill section. As best seen in FIG. 1, each of the hoods 34 is made of a number (here four) of end-to-end abutting hood sections 36-42 each formed of fiberglass. Other suitable materials would be stainless steel or rigid synthetic resin materials. These sections are arranged so that the endmost sections 36 and 42 engage an adjacent wall of the tank 12, such as wall 22 and the opposed sidewall 18 (not shown). Each of these sections 36-42 are identical and include (see FIGS. 2-3) a pair of upright and converging sidewalls 44, 46 which terminate in a rounded apex or top wall 48 and have central, internal stiffening struts 49. The sidewalls 44, 46 include bottom margins 50, 52 which rest atop bottom wall 16. Each of the sidewalls has a plurality of axially spaced apart inlet openings 54 which extend upwardly from the corresponding bottom margin. Each of the sections 36-42 is also equipped with a central, upright, tubular, chimney-like outlet 56 which extends upwardly from top wall 48. Finally, each section has a pair of end walls 57 (see FIG. 2).

The sections 26, 28 and hoods 34 are cooperatively designed to facilitate removal of solids from waste water with a minimum of upkeep problems. To this end, each of the sections 26, 28 is of generally trapezoidal cross-section including inclined outer sidewalls 58 and 60, as well as an upper, generally horizontal top wall 62. In like manner, each of the hood sections 36-42, and thus the entirety of each hood 34, is complementally shaped so that the hood sections are generally triangular in cross-section. The adjacent sidewalls 44 and 46 and 58 and 60 are preferably generally parallel with each other to create converging, restricted flow paths for waste water-solids suspensions. These walls are oriented at an angle of from about 50-75° relative to the horizontal, and are most preferably about 60°. The hoods 34 and associated fill structures may be of variable height, but generally the hoods range in vertical height from about 20-50 inches, more preferably from about 30-40 inches.

It will be appreciated that the fill sections 26 and 28 occupy a majority of the internal volume defined by the overlying hood 34. In actual practice the fill sections should occupy at least about 75% of the hood volume. Moreover, the spacing between the sidewalls 44 and 58 and 46 and 60 (apart from the regions occupied by the struts 49) should be from about 1 to 5 inches, more preferably from about 2 to 4 inches; at the strut regions the clearance should be at least about ¼ inch.

An outlet pipe 64 is operatively coupled to each of the hood outlets 56, in order to allow withdrawal of waste water and solids from the hood 34 as will be described. The pipes 64 are grouped to form right and left-hand banks 65a and 65b, each made up of four aligned pipes 64. In the embodiment shown, each of the outlet pipes 64 has a short connector pipe 66 extending into a corresponding tubular outlet 56, as well as piping 68 which extends upwardly to communicate with a common, laterally extending trough (not shown) which delivers waste water-solids suspensions to the recycle section 20 (this trough is similar to the trough 120 shown in the referenced U.S. Pat. No. 5,035,795). Each of the outlet pipes 64 also has air inlet pipe 70 for introduction of compressed air into the pipes 64 to create a suction uplift. In order to provide a proper connection between the connector pipes 66 and outlet tubes 56, a resilient elastomeric collar 72 is provided about each connector pipe 66 such that the lower butt end of each collar 72 rests upon the upper end of a corresponding outlet 56. This allows the connector pipe 66 to easily fit and move relative to the associated outlet tube 56, thereby accommodating imprecisely manufactured components and flow-induced relative movement therebetween.

The operation of tank assembly 10 will next be described. It is assumed that the tank 12 is filled with waste water containing solids of various densities, including lightweight flocculants. It will also be assumed that compressed air is being delivered to at least one bank of the outlet pipes 64. This creates a lighter mixture of liquid and air within the outlet pipes, causing it to rise to a discharge trough above water level. This acts as a pump, creating a suction at the apex of the associated hood 34. As water is expelled from the outlet pipes 64 a partial vacuum is created within the hood 34 beneath so that additional water is drawn through the inlet openings 54 adjacent the bottom of each of the hood sidewalls. Normally, solids will have settled to the bottom of the tank 12 in the region adjacent the openings 54. This occurs under the influence of gravity and is augmented by the sloped sidewalls of the hoods 34 and the sloped design of the diverter section 24 and diverter segments, 30, 32. As liquid is drawn into the hood 34, these settled solids will also be drawn in with the liquid. Thus, a suspension of liquid and solids will be expelled out of the pipes 64 for ultimate direction out of the tank 12.

Preferably, the velocity of water through the openings 54 should be great enough so that a scouring velocity is created adjacent the tank floor outside of the openings. Such a high velocity helps keep the inlet openings 54 from plugging. Typically, the system is designed to achieve at least a 1.5 foot per second (fps), more preferably about 2 fps, velocity through the openings 54. Moreover, the spacing between the inner surfaces of the hood sidewalls 44, 46 and the adjacent fill section sidewalls 58,60 is such that a minimum of 1 fps of velocity is maintained in the upward direction, along the restricted flow path between the hood and fill section sidewalls. This is sufficient to maintain a flocculant (e.g., biological sludge or a light chemical sludge) in suspension.

The hood outlet or "chimney" design of the hood sections is also significant. Slight variations expected in normal construction of the components of the assemblies 14 will generally not allow for a precise of even rigid connection between the hood 34 and the pipes 64. Thus, the hood outlets are designed with an internal diameter slightly larger than the outside diameter of the connection pipes 66. The collar 72 ensures an adequate connection between the pipes 66 and the outlets 54, even if these components are not in true vertical alignment. Further, provision of the collars 72 allows the insertion of the connection pipes 66 without touching the sides of the corresponding hood outlets 54 and without imposing any torque on the hood. Preferably, the pipes 66 are inserted at least 2 inches into the outlets 54, which is sufficient to prevent the pipes 66 from pulling out under foreseen operating conditions. Advantageously, each of the outlets 54 extends at least this distance above the apex top wall 48. Without this construction, the pipes 66 could extend below wall 48, essentially forming dams allowing solids and gas to accumulate and preventing the hood apex from being swept clean.

In normal practice, a given tank assembly 10 with multiple assemblies 14 therein would be operated intermittently, i.e., the individual assemblies 14 would be turned on and off in sequence. In the area of the hoods 34, solids would be allowed to settle and accumulate for a typical period of 15-30 minutes (such times may vary depending upon the type of solids to be settled and the size of the treatment facility). At the end of a set time a timer activates a bank (e.g., bank 65*a*) of outlet pipes 64 by directing compressed air therein through the pipes 70 and solids are withdrawn for an adjustable time, usually about 5-10 minutes. This operating procedure prevents bridging of the hood inlets previously described. Further, the relatively rapid removal of waste water and solids purges and scours the areas around the hood inlets to further prevent bridging. After such a relatively short solids removal step, the delivery of compressed air to the involved bank of pipes 64 is terminated, and solids are again allowed to settle before the next removal cycle.

As indicated, it is normal to operate the assembly 10 so that all outlet pipe banks do not operate simultaneously. For example, if a tank has four removal assemblies, each will be operated on a separate time on and time off sequence. As sludge suction terminates in one assembly, it will be activated in another. This results in a nearly continuous flow of solids from the sedimentation tank, giving the relatively uniform flow into the tank, to help prevent hydraulic disturbances.

I claim:

1. A solids removal assembly adapted for use in a solids removal sedimentation tank presenting a bottom wall and upright sidewalls, said assembly comprising:
   an elongated hood having sloped, converging sidewalls and a top section, said hood defining an internal volume,
   said hood sidewalls having lower margins adapted to rest upon said bottom wall with a plurality of inlet openings adjacent said lower margins,
   said top section including a plurality of spaced apart outlet openings; and
   an elongated fill structure located within said hood and occupying a majority of said internal hood volume,
   said fill structure and said hood sidewalls cooperatively defining a flow path from said inlet openings towards said outlet openings.

2. The assembly of claim 1, said sidewalls oriented at an angle of from about 50-75° from the horizontal.

3. The assembly of claim 2, said angle being about 60°.

4. The assembly of claim 1, said fill structure having sidewalls generally parallel with the internal surfaces of said hood sidewalls.

5. The assembly of claim 1, said fill structure presenting a generally flat top wall.

6. The assembly of claim 1, said fill structure occupying at least about 75% of said internal hood volume.

7. The assembly of claim 1, said hood having a vertical height of from about 20-50 inches.

8. The assembly of claim 7, said vertical height being from about 30-40 inches.

9. The assembly of claim 1, said hood outlet openings comprising upstanding tubular bodies extending above the upper surface of the hood.

10. The assembly of claim 1, including an upright outlet pipe operatively coupled with each of said hood outlet openings.

11. The assembly of claim 10, including a flexible coupler adjoining each of said outlet pipes with a corresponding hood outlet opening.

12. The assembly of claim 1, said hood being generally triangular in cross-section, said fill structure being generally trapezoidal in cross-section.

13. The assembly of claim 1, said hood formed of a material selected from the group consisting of fiberglass, stainless steel and synthetic resin.

14. The assembly of claim 1, said inlet openings extending upwardly from said hood sidewall bottom margins.

15. The assembly of claim 1, wherein said a plurality of inlet openings are axially spaced along the bottom margin of each of said hood sidewalls.

16. A solids removal tank assembly comprising:
    a sedimentation tank including a bottom wall and upstanding sidewalls and;
    a sedimentation removal assembly within said tank, including
    an elongated hood having sloped, converging sidewalls and a top section, said hood defining an internal volume,
    said hood sidewalls having lower margins resting upon said bottom wall with a plurality of inlet openings adjacent said lower margins, said top section including a plurality of spaced apart outlet openings; and an elongated fill structure located within said hood and occupying a majority of said internal hood volume, said fill structure and said hood sidewalls cooperatively defining a flow path from said inlet openings towards said outlet openings.

17. The assembly of claim 16, said sidewalls oriented at an angle of from about 50-75° from the horizontal.

18. The assembly of claim 17, said angle being about 60°.

19. The assembly of claim 16, said fill structure having sidewalls generally parallel with the internal surfaces of said hood sidewalls.

20. The assembly of claim 16, said fill structure presenting a generally flat top wall.

21. The assembly of claim 16, said fill structure occupying at least about 75% of said internal hood volume.

22. The assembly of claim 16, said hood having a vertical height of from about 20-50 inches.

23. The assembly of claim 22, said vertical height being from about 30-40 inches.

24. The assembly of claim 16, said hood outlet openings comprising upstanding tubular bodies extending above the upper surface of the hood.

25. The assembly of claim 16, including an upright outlet pipe operatively coupled with each of said hood outlet openings.

26. The assembly of claim 25, including a flexible coupler adjoining each of said outlet pipes with a corresponding hood outlet opening.

27. The assembly of claim 16, said hood being generally triangular in cross-section, said fill structure being generally trapezoidal in cross-section.

28. The assembly of claim 16, said hood formed of a material selected from the group consisting of fiberglass, stainless steel and synthetic resin.

29. The assembly of claim 16, said inlet openings extending upwardly from said hood sidewall bottom margins.

30. The assembly of claim 16, wherein said a plurality of inlet openings are axially spaced along the bottom margin of each of said hood sidewalls.

* * * * *